(12) United States Patent
Yasuda et al.

(10) Patent No.: US 9,927,282 B2
(45) Date of Patent: Mar. 27, 2018

(54) MAGNET FLOAT LIQUID LEVEL DETECTOR WITH GUIDED LOCKING CASE

(71) Applicant: DENSO CORPORATION, Kariya, Aichi-pref. (JP)

(72) Inventors: Atsushi Yasuda, Kariya (JP); Makoto Hatano, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 171 days.

(21) Appl. No.: 14/894,559

(22) PCT Filed: Jun. 3, 2014

(86) PCT No.: PCT/JP2014/002951
§ 371 (c)(1),
(2) Date: Nov. 30, 2015

(87) PCT Pub. No.: WO2014/196193
PCT Pub. Date: Dec. 11, 2014

(65) Prior Publication Data
US 2016/0103010 A1  Apr. 14, 2016

(30) Foreign Application Priority Data

Jun. 5, 2013  (JP) ................................ 2013-119131

(51) Int. Cl.
*G01F 23/62* (2006.01)
*G01F 23/72* (2006.01)
*G01F 23/74* (2006.01)

(52) U.S. Cl.
CPC .............. *G01F 23/62* (2013.01); *G01F 23/72* (2013.01); *G01F 23/74* (2013.01)

(58) Field of Classification Search
CPC .......... G01F 23/62; G01F 23/72; G01F 23/74; H01H 36/02; H01H 35/18
(Continued)

(56) References Cited

U.S. PATENT DOCUMENTS

| 3,751,614 A * | 8/1973 | Jones ..................... G01F 23/74 200/81 H |
| 4,175,435 A * | 11/1979 | Hara ...................... G01F 23/70 73/313 |

(Continued)

FOREIGN PATENT DOCUMENTS

| FR | 1442538 A * | 6/1966 | ............. G01F 23/74 |
| GB | 2178238 A * | 2/1987 | ............. G01F 23/74 |

(Continued)

OTHER PUBLICATIONS

International Search Report and Written Opinion (in Japanese with English Translation) for PCT/JP2014/002951, dated Jul. 15, 2014; ISA/JP.
U.S. Appl. No. 14/894,554, filed Nov. 30, 2015, Yasuda.

*Primary Examiner* — Peter Macchiarolo
*Assistant Examiner* — David L Singer
(74) *Attorney, Agent, or Firm* — Harness, Dickey & Pierce, P.L.C.

(57) ABSTRACT

A liquid level detector includes a casing, a float, a magnet body, and a switch mechanism. The casing includes a tube section. The float is displaced upward or downward along a gravity direction. The magnet body is held by the float. The switch mechanism is accommodated in the tube section and is switched between an on-state and an off-state. The casing includes a first casing part and a second casing part. The first casing part includes the tube section, a first locking section that is formed radially outward of the tube section, and a first guide section that is formed at a tip of the tube section in an extending direction. The second casing part includes a second locking section and a second guide section.

5 Claims, 7 Drawing Sheets

(58) Field of Classification Search
USPC ...... 73/305, 308, 309, 314, 319, 322.5, 431,
73/866.5; 340/623, 624; 200/84 C;
220/254.1, 254.8, 326, 254, FOR. 203;
24/DIG. 51, DIG. 52, 582.11, 592.1,
24/598.1, 683, 684, 685
See application file for complete search history.

(56) References Cited

U.S. PATENT DOCUMENTS

| | | | | |
|---|---|---|---|---|
| 4,187,262 A | * | 2/1980 | Fessler | B01F 3/04808 |
| | | | | 137/409 |
| 4,943,210 A | * | 7/1990 | Bailey, Jr. | E21B 17/1035 |
| | | | | 200/84 C |
| 2010/0219116 A1 | | 9/2010 | Milum | |

FOREIGN PATENT DOCUMENTS

| | | | | | | |
|---|---|---|---|---|---|---|
| JP | 56103323 A | * | 8/1981 | | ........... | G01F 23/303 |
| JP | 63214621 A | * | 9/1988 | | | |
| JP | 2000009521 A | * | 1/2000 | | | |
| JP | 2002062180 A | * | 2/2002 | | | |
| JP | 2003194619 A | | 7/2003 | | | |
| JP | 2003194620 A | * | 7/2003 | | | |
| JP | 3757862 B2 | | 3/2006 | | | |
| JP | 2010502438 A | | 1/2010 | | | |
| JP | 2011153920 A | | 8/2011 | | | |
| JP | 2011185616 A | * | 9/2011 | | | |
| JP | 2012246888 A | | 12/2012 | | | |
| JP | 2013002965 A | | 1/2013 | | | |

* cited by examiner

MAGNET FLOAT LIQUID LEVEL DETECTOR WITH GUIDED LOCKING CASE

CROSS REFERENCE TO RELATED APPLICATIONS

This application is a U.S. National Phase Application under 35 U.S.C. 371 of International Application No. PCT/JP2014/002951 filed on Jun. 3, 2014 and published in Japanese as WO 2014/196193 A1 on Dec. 11, 2014. This application is based on and claims the benefit of priority from Japanese Patent Application No. 2013-119131 filed on Jun. 5, 2013. The entire disclosures of all of the above applications are incorporated herein by reference.

TECHNICAL FIELD

The present disclosure relates to a liquid level detector to detect the height of the surface of a liquid stored in a container.

BACKGROUND ART

A liquid level detector having a float floating on a liquid surface, a magnet retained by the float, and a switch mechanism such as a reed switch to switch from an off-state to an on-state by the movement of the magnet in the gravity direction, such as an oil level sensor disclosed in Patent Document 1 for example, has heretofore been known. A casing of the oil level sensor is configured by assembling a cover to cover a float to a housing having a tube section to contain a switch mechanism.

PRIOR ART DOCUMENT

Patent Document

Patent Document 1: JP2003-194619A

Meanwhile, the present inventors have come to think a configuration of attaching a cover to a housing by locking a locking nail formed in the cover to a locking hole formed in the housing for example in such a liquid level detector as Patent Document 1. By such a casing configuration however, a worker has to adjust the locking nail of the cover accurately to a location engageable with the locking hole of the housing when the cover is assembled to the housing. Consequently, it has taken time in the process of locking the locking nail to the locking hole and hence the workability in the assembly of a liquid level detector has deteriorated.

SUMMARY OF INVENTION

The present disclosure addresses the above issues. Thus, it is an objective of the present disclosure to provide a liquid level detector making it possible to improve assembly workability.

To achieve the objective of the present disclosure, a liquid level detector for detecting a level of a surface of liquid stored in a container in an aspect of the present disclosure includes a casing, a float, a magnet body, and a switch mechanism. The casing is fixed to the container and includes a tube section extending in a gravity direction. The float floats on the surface of liquid and is displaced upward or downward along the gravity direction, being guided by the tube section. The magnet body is held by the float to be displaced upward or downward in conformity with the surface of liquid. The switch mechanism is accommodated in the tube section and is switched between its on-state and off-state by the upward or downward displacement of the magnet body. The casing includes a first casing part and a second casing part. The first casing part includes the tube section, a first locking section that is formed radially outward of the tube section, and a first guide section that is formed at a tip of the tube section in its extending direction. The second casing part includes a second locking section that supports the first casing part by engagement with the first locking section, and a second guide section that generates rotative force around the tube section to guide the first casing part toward a normal location where the first locking section is capable of engaging with the second locking section, by contact of the second guide section with the first guide section.

According to that, by making a first guide section formed at the tip of a tube section of a first casing part contact with a second guide section of a second casing part when the first casing part is assembled to the second casing part, a torque around the tube section is generated in the first casing part. By guiding the first casing part to a normal location by the torque, a first locking section can move to a location engageable with a second locking section. In this way, by having the guide sections exhibit the guiding action, the work of locking the first locking section and the second locking section to each other is facilitated. Consequently, the assembly workability of a liquid level detector improves.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Embodiments are explained hereunder in reference to the drawings. Here, a duplicate explanation is sometimes avoided by using an identical code for corresponding constituent components in the embodiments When only a part of a configuration is explained in each of the embodiments, it is possible to apply the configuration of another previously explained embodiment to the other part of the configuration. Further, it is possible to not only combine the configurations clarified in the explanations of the embodiments but also partially combine the configurations of the embodiments even when it is not specified as long as the combination does not cause a problem. Then a not-clarified combination of configurations described in the embodiments and modified examples is also regarded as disclosed in the following explanations.

First Embodiment

Figure 1:
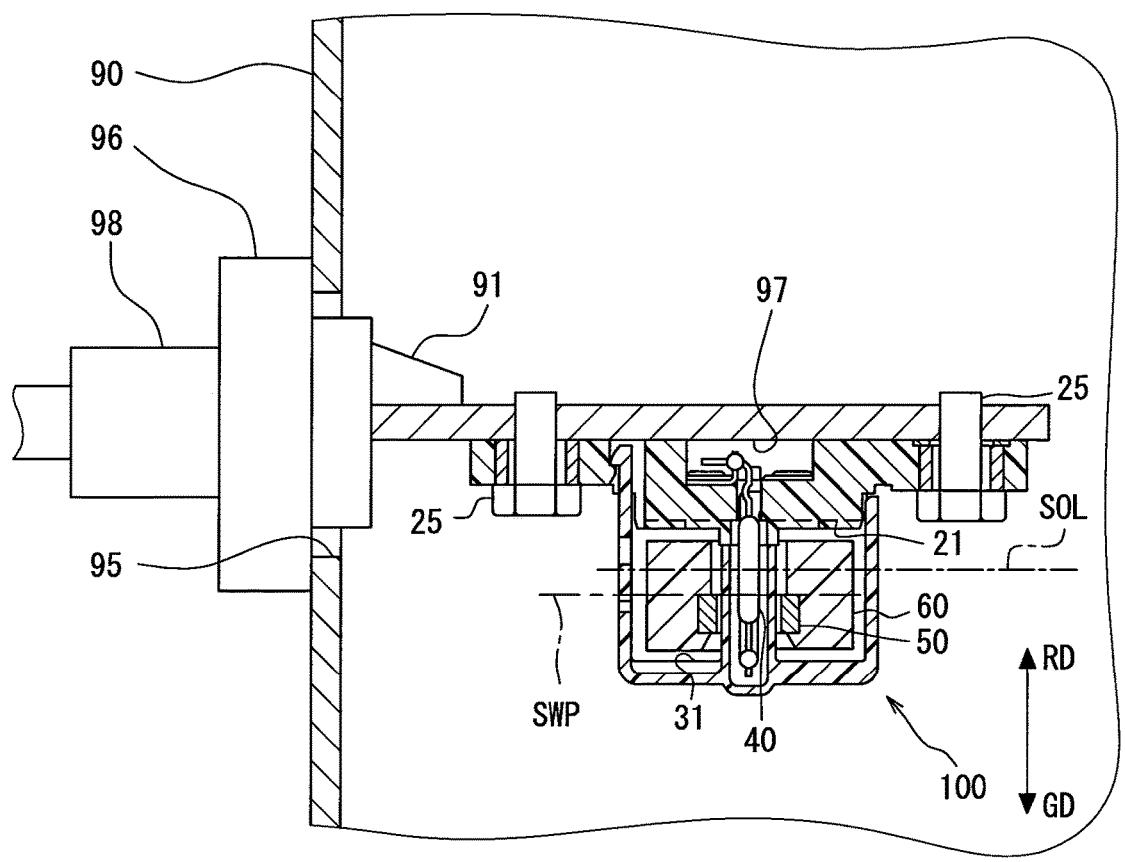
FIG. 1 is a view showing the state of installing a liquid level detector according to First Embodiment in an oil pan.

A liquid level detector 100 according to First Embodiment shown in FIG. 1 is mounted on an internal combustion engine and installed in an oil pan 90. The oil pan 90 is attached to the bottom face of a cylinder block of the internal combustion engine and stores engine oil as a liquid. The liquid level detector 100 detects the height of the surface of the engine oil stored in the oil pan 90.

A liquid level detector 100 is fixed to an oil pan 90 with a bracket 91 interposed. The bracket 91 has a lid section 96, a mounting section 97, and a connector section 98. The lid section 96 is formed into a disk shape having a diameter larger than an opening 95 for inserting the liquid level detector 100 into the oil pan 90. The lid section 96 covers the opening 95 by liquid-tightly adhering to the peripheral part of the opening 95 from the exterior of the oil pan 90. The mounting section 97 extends tabularly from the lid section 96. The mounting section 97 is supported by the lid section 96. The liquid level detector 100 is mounted on the bottom face of the mounting section 97 directed toward the gravity direction GD. The connector section 98 protrudes from the lid section 96 toward the exterior of the oil pan 90. A connector section (not shown in the figure) on the counterpart side for electrically connecting an external in-vehicle device (for example a combination meter or the like) to the liquid level detector 100 engages with the connector section 98.

Figure 2:
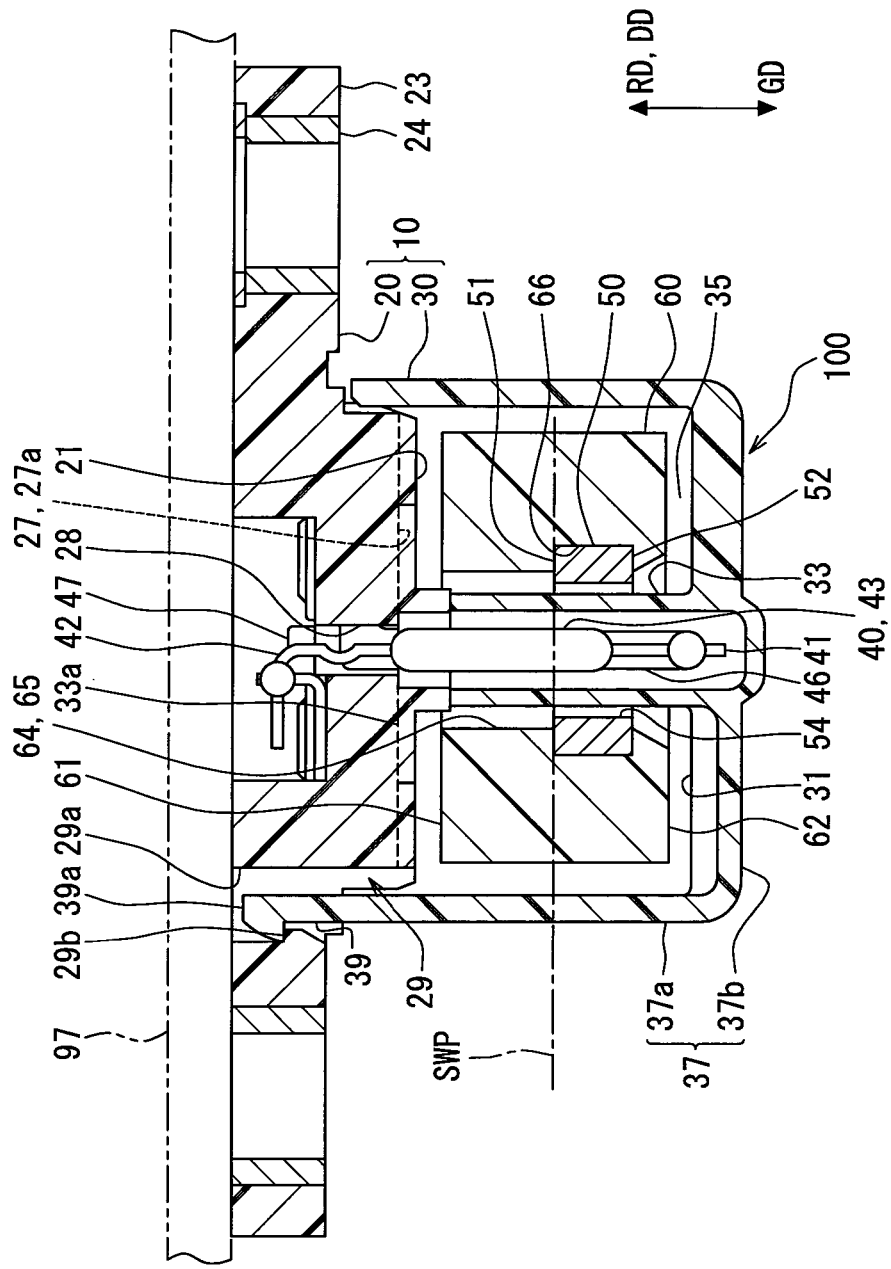
FIG. 2 is a view explaining the configuration and operation of a liquid level detector according to First Embodiment.

As shown in FIG. 2, the liquid level detector 100 includes a casing 10, a float 60, a magnet 50, a reed switch 40, terminals 46 and 47 and others.

The casing 10 includes a body 20, a cover 30, and others. The body 20 and the cover 30 constitute a container 35 to contain the float 60. The body 20 and the cover 30 are formed of a polyphenylene sulfide (PPS) resin or the like for example.

Figure 3:
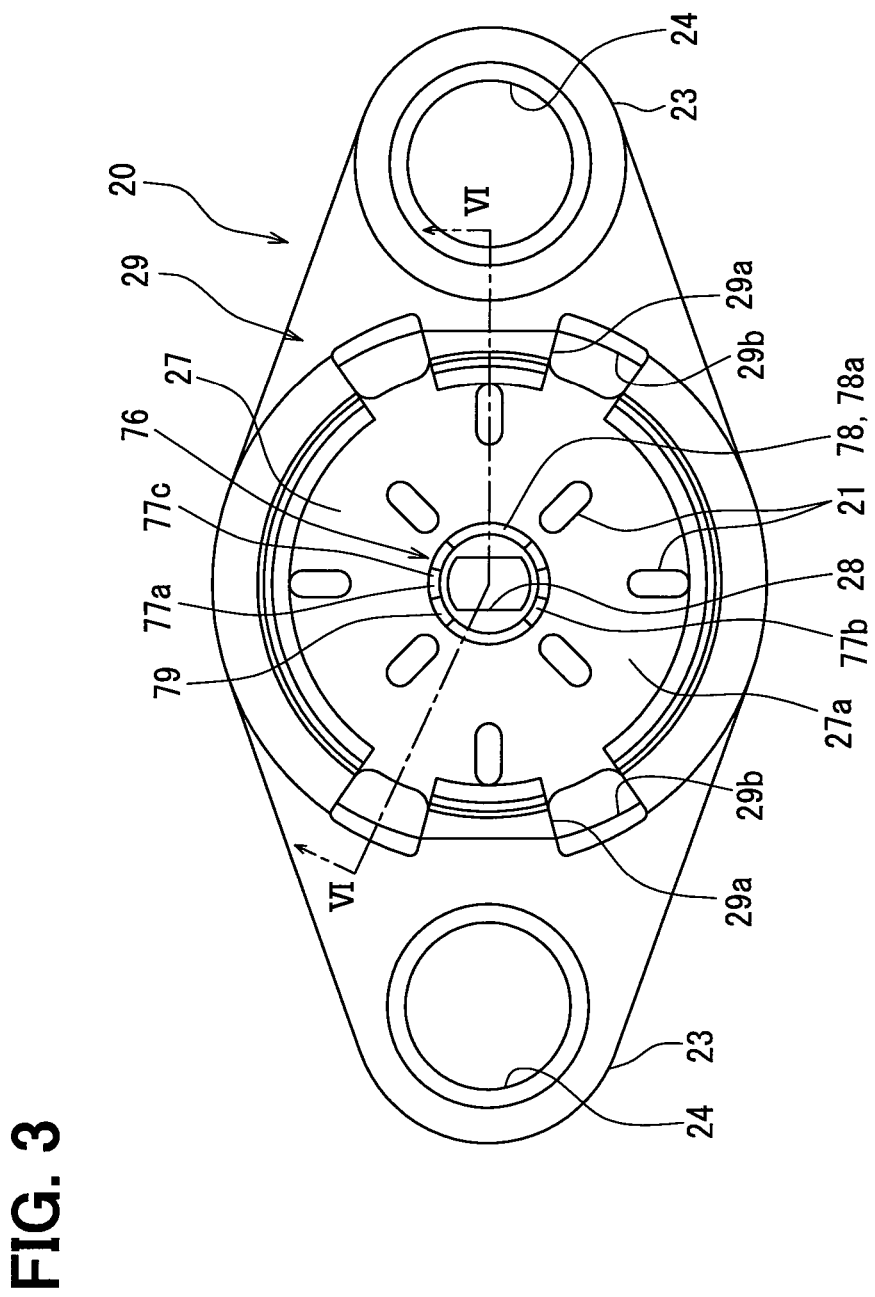
FIG. 3 is a plan view of a body according to First Embodiment.

A body 20 shown in FIGS. 2 and 3 has a flange section 23 and a body partition wall 27. The flange section 23 is formed into a flange-like shape outside the body partition wall 27 formed into a disk-like shape. Attachment rings 24 are embedded into the flange section 23. Further, a body locking section 29 is formed in the flange section 23. The attachment rings 24 are cylindrical parts including a metal such as iron. Fastening members 25 (refer to FIG. 1) for fixing the body 20 to the mounting section 97 are inserted into the attachment rings 24. The body locking section 29 is configured so as to retain a cover 30. The body locking section 29 includes a plurality of locking holes 29a. Four locking holes 29a are formed distantly from each other around the body partition wall 27. The locking holes 29a penetrate the flange section 23 in the gravity direction GD.

The body partition wall 27 is a wall section formed into a disk-like shape to partition a container 35. A through-hole 28 and body stoppers 21 are formed in the body partition wall 27. The through-hole 28 is formed in the center of the body partition wall 27. The through-hole 28 penetrates the body partition wall 27 in the gravity direction GD. The body stoppers 21 are formed protrusively from a wall face 27a of the body partition wall 27 toward the direction opposite to the gravity direction GD (hereunder referred to as a "reverse direction RD"). The body stoppers 21 extend in radial directions of the body partition wall 27. The body stoppers 21 are arranged at equally-spaced intervals (at the intervals of 90° for example) in a circumferential direction around the through-hole 28.

Figure 4:
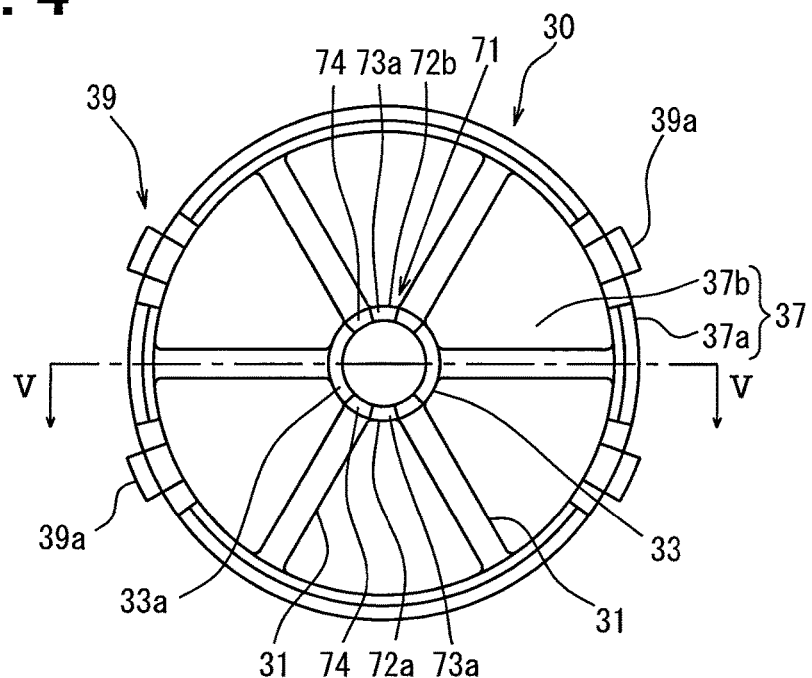
FIG. 4 is a bottom view of a cover according to First Embodiment.

The cover 30 shown in FIGS. 2 and 4 is formed into a cylindrical shape having a bottom as a whole. The cover 30 has a cylinder section 33, a cover partition wall 37, and a cover locking section 39. The cylinder section 33 is formed in the center of a bottom wall section 37b of the cover 30 in the radial direction. The cylinder section 33 is formed along the axis of the cover 30 directed in the gravity direction GD and extends cylindrically toward the reverse direction RD. A reed switch 40 and a terminal 46 are contained in the cylinder section 33. A tip part 33a of the cylinder section 33 located on the side opposite to the bottom wall section 37b is in contact with the peripheral part of the body partition wall 27 around the through-hole 28.

The cover partition wall 37, together with the body partition wall 27, partitions the container 35. The cover partition wall 37 has a peripheral wall section 37a located on the outer periphery side of the float 60 and the bottom wall section 37b located in the reverse direction RD beyond the float 60. A plurality of communication holes 36a and 36b are formed in the peripheral wall section 37a (see FIG. 5). The communication holes 36a and 36b penetrate the peripheral wall section 37a in radial directions. The communication holes 36a and 36b make the container 35 located inside the peripheral wall section 37a communicate with the exterior of the peripheral wall section 37a. Meanwhile, cover stoppers 31 are formed at the bottom wall section 37b. The cover stoppers 31 are arranged so as to face the body stoppers 21 in the gravity direction GD (vertical direction). The cover stoppers 31 are extendedly formed radially from the cylinder section 33 toward the outside in radial directions. The cover stoppers 31 are arranged at equally-spaced intervals (at the intervals of 60° for example) in a circumferential direction around the cylinder section 33.

The cover locking section 39 supports the cover 30 by engaging with the body locking section 29. The cover locking section 39 includes a plurality of locking nails 39a. The locking nails 39a are formed on the outer peripheral side of the cylinder section 33, arranged in accordance with the locking holes 29a, and formed at four sites in a peripheral wall section 37a. The locking nails 39a extend from the peripheral wall section 37a toward the reverse direction RD opposite to the gravity direction GD so as to be insertable into the locking holes 29a. The cover 30 is attached to the body 20 by locking the locking nails 39a to peripheral walls 29b of the locking holes 29a.

A float 60 shown in FIG. 2 is formed of a material having a specific gravity smaller than engine oil, such as a foamed phenol resin for example. The float 60 can float on the surface of engine oil. The float 60 is formed into a cylindrical shape having a center hole 64. The cylinder section 33 is inserted into the center hole 64. The float 60 thereby moves vertically along the gravity direction GD in conformity with a liquid level while being guided by the cylinder section 33. A circular retention groove 66 extending in the circumferential direction is formed on an inner wall face 65 of the center hole 64. The float 60 is arranged between the body stoppers 21 and cover stoppers 31. A float top face 61 and a float bottom face 62 of the float 60 located on the sides opposite to each other with a magnet 50 interposed are formed into planar shapes. The vertical movement of the float 60 in the gravity direction GD is restricted by the contact between the float top face 61/the float bottom face 62 and the body stoppers 21/the cover stoppers 31.

The magnet 50 is a permanent magnet such as a ferrite magnet. The magnet 50 is formed into a cylindrical shape extending in the gravity direction GD. The outer diameter of the magnet 50 is set so as to be smaller than the outer diameter of the float 60. The inner diameter of a center hole 54 of the magnet 50 is set so as to be slightly smaller than the inner diameter of the center hole 64 of the float 60. The magnet 50 is fitted into the retention groove 66 and thus retained by the float 60. The magnet 50 moves vertically in conformity with a liquid level in the state of inserting the cylinder section 33 into the magnet 50 together with the float 60.

The reed switch 40 is a detection element for detecting a liquid level. The reed switch 40 has a main body part 43 formed into a cylindrical shape and a pair of reeds 41 and 42 extending from both the ends of the main body part 43 respectively. The reed switch 40 is contained in the cylinder section 33 in the position of directing the axis of the main body part 43 in the gravity direction GD. The main body part 43 is a glass tube of a hollow cylindrical shape and contains the end sections (hereunder referred to as "reed end sections") of the respective reeds 41 and 42. The reed end sections are installed bendably and face each other at a prescribed interval in a direction perpendicular to the gravity direction GD. When a magnetic field acts on the reeds 41 and 42 from the exterior, the reed end sections are magnetized into magnetic poles different from each other and attract each other. By the contact of the reed end sections in this way, the reed switch 40 comes to be in an on-state of being conductive between the reeds 41 and 42.

The on-state and the off-state of the reed switch 40 are switched in accordance with the relative position of the magnet 50 moving vertically. A virtual switching plane SWP for switching the on-state and the off-state is defined beforehand in the reed switch 40. Concretely, the reed switch 40 keeps the on-state in the state where the magnet 50 strides the switching plane SWP in the gravity direction GD. In contrast, the reed switch 40 comes to be in the off-state in the state where a top end face 51 of the magnet 50 is located in the gravity direction GD beyond the switching plane SWP. The switching plane SWP is a plane perpendicular to the axis of a main body part 43 and is defined at a location passing through reed ends in contact with each other. In addition, the switching plane SWP according to First Embodiment is defined at a location closer to the terminal 46 than the center of the main body part 43 in the axial direction.

The terminals 46 and 47 are formed of an electrically conductive material such as brass and are formed into a band shape. The terminals 46 and 47 are formed so as to be inserted into the body 20 and are thereby retained by the body 20. The terminal 46 is contained in the cylinder section 33 and extends in the gravity direction GD up to a location closer to the bottom wall section 37b than to the main body part 43. The terminal 46 is connected to a reed 41 and supports the reed 41. The terminal 47 is connected to the other reed 42 in the vicinity of the through-hole 28 and supports the reed 42. The reed switch 40 is attached to the terminals 46 and 47 and is thereby retained by the body 20.

In the case of installing the liquid level detector 100 on the bracket 91 as shown in FIGS. 1 and 2, when a liquid level is sufficiently higher than a detection liquid level SOL, the upward movement of the float 60 is restricted by the contact of the float top face 61 to the body stoppers 21. On this occasion, the top end face 51 can be located in the reverse direction RD (upward) beyond the switching plane SWP. In contrast, the bottom end face 52 can be located in the gravity direction GD (downward) beyond the switching plane SWP. Since the magnet 50 is in the state of striding the switching plane SWP in the gravity direction GD therefore, the reed switch 40 comes to be in the on-state by the magnetic field generated by the magnet 50.

Then when the stored engine oil reduces, the top end face 51 can move in the gravity direction GD (downward) beyond the switching plane SWP before the float bottom face 62 of the descending float 60 comes into contact with the cover stoppers 31. The reed switch 40 therefore switches from the on-state to the off-state by having the liquid level of the engine oil descend below the detection liquid level SOL.

In the liquid level detector 100 explained heretofore, a casing 10 is formed by assembling the cover 30 to the body 20. A cover guide section 71 of the cover 30 and a body guide section 76 of the body 20, those being formed in order to facilitate such assembly work, are hereunder explained in detail.

Figure 5:
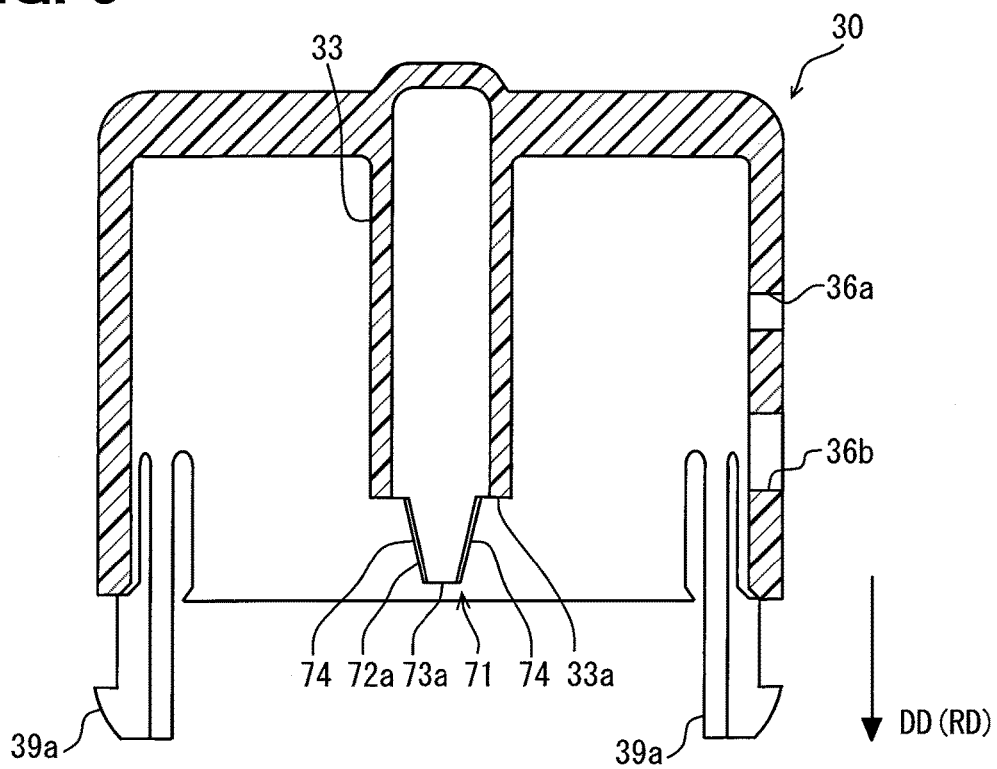
FIG. 5 is a sectional view explaining the configuration of a cover and being taken on a line V-V of FIG. 4.
Figure 7:
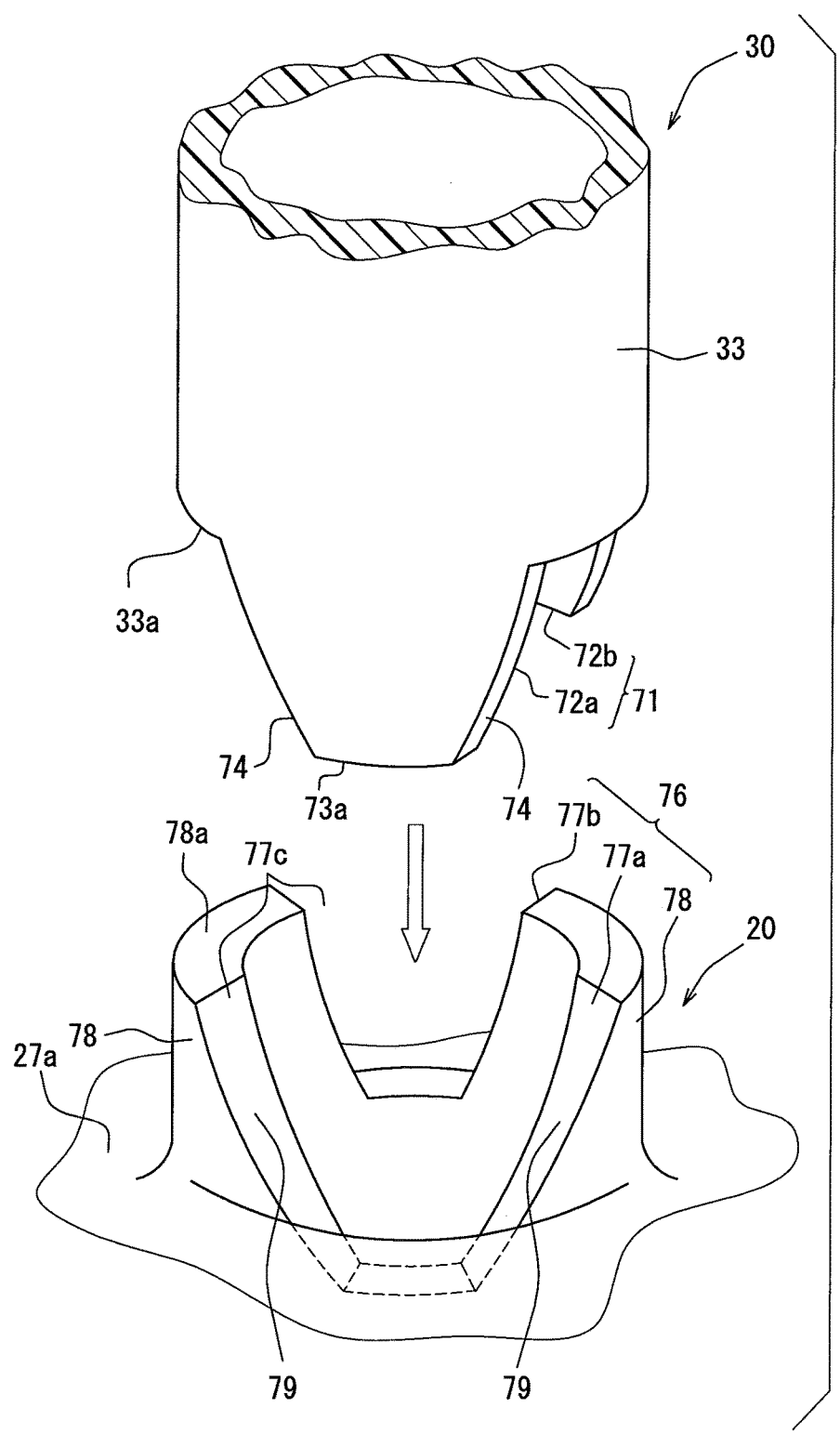
FIG. 7 is an enlarged schematic view enlargedly showing a body guide section and a cover guide section according to First Embodiment.

The cover guide section 71 shown in FIGS. 4, 5, and 7 is formed at the tip part 33a of the cylinder section 33 in the extending direction DD. The cover guide 71 has a plurality of (concretely two) guide walls 72a and 72b. The guide walls 72a and 72b are formed protrusively from the tip part 33a in the extending direction DD. The guide walls 72a and 72b are arranged distantly in the circumferential direction of the cylinder section 33 and are located apart from each other at the angles of 180°. In the guide walls 72a and 72b, the shape of one is different from the shape of the other. Concretely, the size of the guide wall 72a is larger than the size of the guide wall 72b. The outer width of each of the guide walls 72a and 72b in the circumferential direction of the cylinder section 33 reduces continuously with distance from the tip part 33a. By the shapes of gradually reducing the outer widths in this way, a pair of inclined faces 74 and a top face 73a are formed in each of the guide walls 72a and 72b. Each of the guide walls 72a and 72b exhibits a tabular trapezoidal shape curved along the cylinder section 33.

Figure 6:
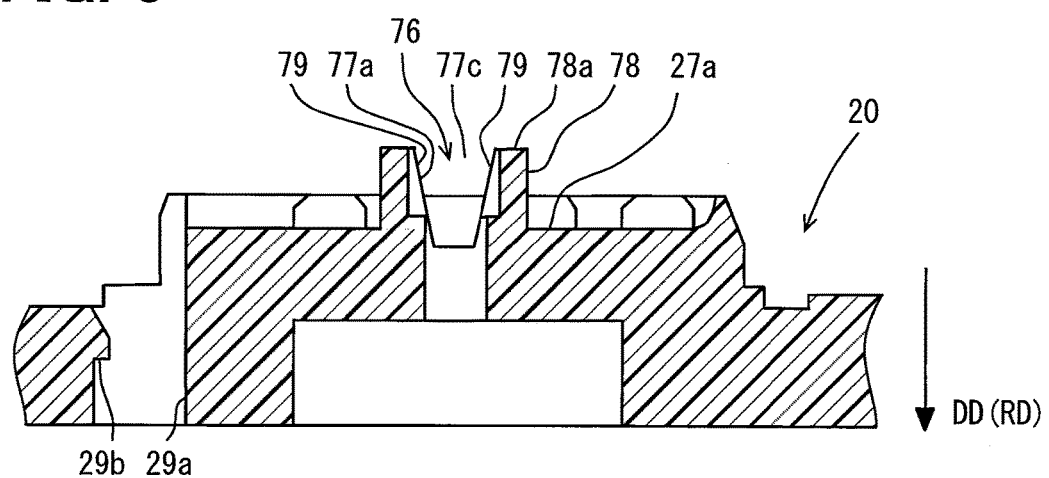
FIG. 6 is a sectional view explaining the configuration of a body and being taken on a line VI-VI of FIG. 3.

The body guide section 76 shown in FIGS. 3, 6, and 7 is formed around the through-hole 28 so as to be contactable with the cover guide section 71. The body guide section 76 has a raised wall 78 and a plurality of guide recesses 77a and 77b. The raised wall 78 is a cylindrical wall section formed by raising the wall face 27a located around the through-hole 28 toward the tip part 33a. The raised wall 78 can be arranged concentrically with the cylinder section 33 and has an inner diameter and an outer diameter comparable to the cylinder section 33 so as not to interfere with the vertical movement of the float 60 (refer to FIG. 2).

Each of the guide recesses 77a and 77b is formed by making a top section 78a of the raised wall 78 recessed in the direction distant from the tip part 33a, namely in the extending direction DD. The guide recesses 77a and 77b are formed so as to have shapes and arrangements corresponding to the guide walls 72a and 72b respectively. Concretely, the shape and formed location of the guide recess 77a correspond to the shape and formed location of the guide wall 72a and the shape and formed location of the guide recess 77b correspond to the shape and formed location of the guide wall 72b. The guide wall 72a therefore is insertable only into the guide recess 77a. By the configuration, only when the locking nails 39a (refer to FIG. 5) and the peripheral walls 29b of the locking holes 29a are at engageable locations respectively (hereunder referred to as a "normal location") with regard to the relative phase of the cover 30 to the body 20, the guide walls 72a and 72b are insertable into the guide recesses 77a and 77b respectively. The inner width of each of the guide recesses 77a and 77b in the circumferential direction of the cylinder section 33 reduces with distance from an opening 77c of each of the guide recesses 77a and 77b. By the shape of reducing the inner width in this way, a pair of inclined faces 79 is formed in each of the guide recesses 77a and 77b.

With regard to the work of assembling the body 20 and body 30 explained above to each other, the mechanism of guiding the relative phase into the normal location is explained hereunder in reference to FIG. 7.

When a worker tries to assemble the cover 30 to the body 20, in the case where the relative phase of the cover 30 to the body 20 deviates largely from the normal location, the top face 73a of each of the guide walls 72a and 72b comes into contact with the top section 78a of the raised wall 78 rising from the wall face 27a. Under the situation, when the worker rotates the cover 30 around the body 20 in the circumferential direction of the cylinder section 33 and brings the relative phase close to the normal location, the top faces 73a of the guide walls 72a and 72b can pass through the openings 77c and be inserted into the guide recesses 77a and 77b respectively. The inclined faces 74 of the guide walls 72a and 72b thereby come into contact with the inclined faces 79 of the guide recesses 77a and 77b respectively. As a result, as a reactive force against the force of the worker bringing the cover 30 close to the body 20, a torque in the circumferential direction around the cylinder section 33 is generated between the guide walls 72a and 72b and the guide recesses 77a and 77b. The torque can assist the relative rotation of the cover 30 to the body 20 and guide the cover 30 toward the normal location.

In First Embodiment explained heretofore, by generating a torque to guide the relative phase of the cover 30 to the normal location between the guide sections 71 and 76, the locking nails 39a can move without fail to the locations where the locking nails 39a are engageable with the locking holes 29a even when the worker does not intend intensively. The work of inserting the locking nails 39a into the locking holes 29a and locking them to each other therefore is facilitated. Consequently, the assembly workability of the liquid level detector 100 can be improved.

In addition, the guide sections 71 and 76 formed by combining the guide walls 72a and 72b with the guide recesses 77a and 77b respectively like First Embodiment can keep a simple configuration. Then by forming the inclined faces 74 and 79 in the guide walls 72a and 72b and the guide recesses 77a and 77b respectively, the torque to rotate the cover 30 toward the normal location can be obtained without fail. Consequently, the configuration obtained by combining the guide walls 72a and 72b with the guide recesses 77a and 77b is preferable in order to improve the assembly workability of the liquid level detector 100 without fail while the complication of the detector 100 is avoided. According to First Embodiment further, the top section 78a of the raised wall 78 rising from the wall face 27a can come into contact with the tip part 33a first in the event of the assembly work. Before the locking nails 39a come into contact with the flange section 23 therefore, the torque is generated for the guide walls 72a and 72b and the cover 30 can be guided into the normal location. Consequently, the work to lock the locking nails 39a to the peripheral walls 29b of the locking holes 29a is facilitated without fail.

According to First Embodiment furthermore, by forming two guide walls 72a and 72b and two guide recesses 77a and 77b, the torque around the cylinder section 33 to guide the cover 30 toward the normal location is secured easily. In addition, the guide wall 72a can be inserted only into the guide recess 77a corresponding to the guide wall 72a but cannot be inserted into the other guide recess 77b. The situation of undesirably guiding the cover 30 toward a wrong location deviating from the normal location at an angle of 180° can therefore be avoided.

Then in an embodiment of inserting the locking nails 39a into the locking holes 29a like First Embodiment, it is concerned that, when the cover 30 is assembled to the body 20, the locking nails 39a come into contact with the peripheral walls 29b of the locking holes 29a and resultantly the locking nails 39a are broken. By adopting the configuration of guiding the locking nails 39a to the normal location by the torque generated at the guide sections 71 and 76 however, the locking nails 39a can easily and accurately be inserted into the corresponding locking holes 29a. Consequently, by applying the configuration to the liquid level detector 100 of assembling the cover 30 and the body 20 to each other with the locking holes 29a and the locking nails 39a, it is possible to further conspicuously exhibit the effect of improving the workability.

Here, in First Embodiment, the body 20 corresponds to a "second casing part" and the body locking section 29 corresponds to a "second locking section". Then the cover 30 corresponds to a "first casing part", the cylinder section 33 corresponds to a "tube section", the tip part 33a corresponds to a "tip", and the cover locking section 39 corresponds to a "first locking section". Further, the reed switch 40 corresponds to a "switch mechanism" and the magnet 50 corresponds to a "magnet body". Then the cover guide section 71 corresponds to a "first guide section", the body guide section 76 corresponds to a "second guide section", and the oil pan 90 corresponds to a "container".

Second Embodiment

Figure 8:
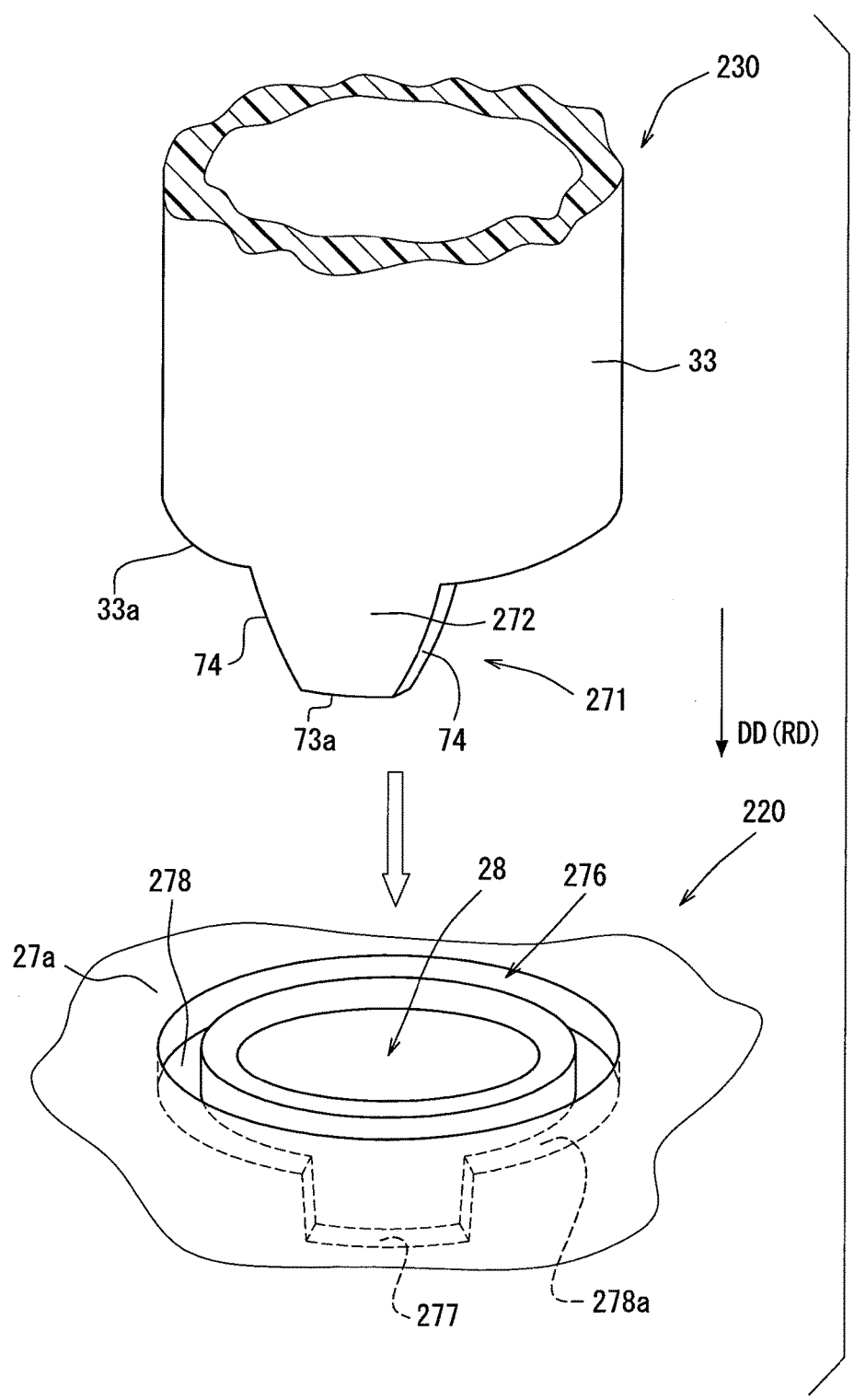
FIG. 8 is an enlarged schematic view enlargedly showing a body guide section and a cover guide section according to Second Embodiment.

Second Embodiment shown in FIG. 8 is a modified example of First Embodiment. A cover guide section 271 and a body guide section 276 formed in a cover 230 and a body 220 respectively according to Second Embodiment are explained hereunder in detail.

The cover guide section 271 has a guide wall 272 corresponding to the guide wall 72a (refer to FIG. 7) in First Embodiment. A pair of inclined faces 74 and a top face 73a are formed in the guide wall 272. The body guide section 276 has a circular groove 278 and a guide hole 277 corresponding to the guide recess 77a (refer to FIG. 7) in First Embodiment. The circular groove 278 is an annular groove surrounding the circumference of a through-hole 28. The circular groove 278 is formed by making a wall face 27a recessed. The groove width of the circular groove 278 is set so as to be slightly larger than the thickness of the guide wall 272. The guide hole 277 is formed by making a bottom section 278a of the circular groove 278 recessed in the direction distant from a tip part 33a, namely in the extending direction DD. The guide hole 277 is formed so as to have a shape and arrangement corresponding to the guide wall 272. As a result, only when the relative phase of the cover 230 to the body 220 is a normal location, the guide wall 272 can be inserted into the guide hole 277.

In the work of assembling the body 220 and the cover 230 to each other as explained above, even in the case where the relative phase of the cover 230 to the body 220 deviates largely from the normal location, the top face 73a of the guide wall 272 can be inserted into the circular groove 278. A worker therefore can rotate the cover 230 relatively toward the normal location so that the guide wall 272 may move while being guided by the circular groove 278. Then when the guide wall 272 is inserted into the guide hole 277, a torque is generated in the circumferential direction around a cylinder section 33 by the inclination of the inclined faces 74. By the torque, the cover 230 is guided toward the normal location.

In Second Embodiment heretofore explained too, such a torque as to guide the relative phase of the cover 230 to the normal location is generated between the guide sections 271 and 276. The work of inserting locking nails 39a into locking holes 29a (refer to FIG. 2) and locking them to each other therefore is facilitated. Consequently, the assembly workability of a liquid level detector can be improved likewise in Second Embodiment too.

In Second Embodiment in addition, by having the circular groove 278 guide the top face 73a of the guide wall 272, the process of rotating the cover 230 in the circumferential direction of the cylinder section 33 is facilitated. In this way, in a process prior to the generation of a torque too, the easiness of work is secured and hence the assembly workability of a liquid level detector can be improved further.

Here, in Second Embodiment, the body 220 corresponds to a "second casing part", the guide hole 277 corresponds to a "guide recess", and the cover 230 corresponds to a "first casing part". Further, the cover guide section 271 corresponds to a "first guide section" and the body guide section 276 corresponds to a "second guide section".

Although the embodiments have heretofore been explained, the present disclosure should not be interpreted only by the embodiments and can be applied to various embodiments and combinations within the scope not departing from the tenor of the present disclosure.

In the embodiments, the guide wall is formed in the cover and the guide recess is formed in the body. The guide recess however may be formed in the cover and the guide wall may be formed in the body. Further, both the guide recess and the guide wall may be formed in each of the cover and the body. Furthermore, the configuration of guide sections is not limited to the combination of the guide recess and the guide wall and may also be a combination of a groove and a protrusion or another combination.

In the embodiments, the locking nails are formed in the cover and the locking holes are formed in the body. However, the locking holes may be formed in the cover and the locking nails may be formed in the body. Further, both the locking nails and the locking holes may be formed in each of the cover and the body. Furthermore, the configuration for locking the cover to the body is not limited to the combination of the locking nails and locking holes stated above. Various shapes used as snap-fit may be formed in the cover and the body as a "locking section".

In the embodiments, the cover corresponds to a "first casing part" and the body corresponds to a "second casing part". However, the cover may correspond to a "second casing part" and the body may correspond to a "first casing part". Further, another member or assembled body constituting the casing may correspond to either of the "first casing part" and the "second casing part".

In the embodiments, an uneven level is formed by the raised wall, the circular groove, or the like at the part where the guide recess or the guide hole is formed. The guide recess and the guide hole however may have a shape recessed from the wall face 27a.

In First Embodiment, the inclined faces 74 and 79 are formed in both the guide walls and the guide recesses respectively. The inclined faces however may be formed only in the guide wall 272 like Second Embodiment or only in a guide recess. Further, the inclination angle of each of the inclined faces may be changed arbitrarily.

In First Embodiment, the two guide recesses and the two guide walls are formed. The numbers of the guide recesses and the guide walls may be changed arbitrarily. Further, when multiple numbers of the guide recesses and the guide walls are formed, attachments at wrong locations can be avoided by differentiating the spaces and the shapes from each other. The multiple guide recesses and guide walls however may have an identical shape to each other.

In First Embodiment, the raised wall is formed so as to face the cylinder section. The sum of the lengths of the raised wall and each of the guide walls in the extending direction DD is desirably longer than the length of the part, inserted into a locking hole, of each of the locking nails. By such dimensional relationship, the contact between the tip of a locking nail and the flange section in assembly work can be avoided.

In the embodiments, the liquid level detector is fixed to the container such as the oil pan with the bracket interposed. The structure for attaching the liquid level detector however is not limited to the aforementioned cases. For example, a configuration in which the liquid level detector is attached directly to the bracket arranged in the oil pan and is connected to the lid section 96 with a harness is also acceptable.

Although the explanations have heretofore been made on the basis of the cases of applying the present disclosure to the liquid level detector to detect the liquid level of engine oil stored in an oil pan or the like of a vehicle, the application of the present disclosure is not limited to the detection of the liquid level of the engine oil. The present disclosure is applicable to a liquid level detector in a container for another liquid, such as a brake fluid, engine cooling water, a fuel, or the like, mounted on a vehicle. Moreover, the present disclosure is applicable to a liquid level detector not only for a vehicle but also in a container arranged in various kinds of consumer devices and various kinds of transport machines.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A liquid level detector for detecting a level of a surface of liquid stored in a container, the liquid level detector comprising:
 a casing that is fixed to the container and includes a tube section extending along a gravity direction;
 a float that floats on the surface of liquid and that is displaced upward or downward along the gravity direction, being guided by the tube section;
 a magnet body that is held by the float to be displaced upward or downward in conformity with the surface of liquid; and
 a switch mechanism having an on-state and an off-state is accommodated in the tube section and is switched between the on-state and the off-state by the upward or downward displacement of the magnet body, wherein the casing includes:

a first casing part including:
  the tube section;
  a first locking section that is formed radially outward of the tube section; and
  a first guide section that is formed at a tip of the tube section in an extending direction of the tube section; and
a second casing part including:
  a second locking section that supports the first casing part by engagement with the first locking section; and
  a second guide section configured to rotatingly guide the first casing part such that the first locking section engages the second locking section and the second guide section contacts the first guide section, wherein:
the first guide section includes a guide wall that is provided erectly from the tip in the extending direction;
the second guide section includes a guide recess that is recessed in a direction separating from the tip;
the guide wall of the first guide section is one of two guide walls that have different shapes from each other and are arranged at intervals in a circumferential direction of the tube section;
the guide recess of the second guide section is one of two guide recesses that have shapes corresponding to those of the two guide walls respectively; and
at least one of the two guide walls is capable of being inserted only into one of the two guide recesses.

2. The liquid level detector according to claim 1, wherein the second guide section includes:
  a raised wall that rises toward the tip; and
  the guide recess is recessed from a top section of the raised wall.

3. The liquid level detector according to claim 1, wherein an outer width of the guide wall in a circumferential direction of the tube section reduces in the direction separating from the tip.

4. The liquid level detector according to claim 1, wherein an inner width of the guide recess in a circumferential direction of the tube section reduces in a direction separating from an opening of the guide recess.

5. The liquid level detector according to claim 1, wherein:
  the second locking section includes a locking hole that opens toward the first locking section; and
  the first locking section includes a locking nail that extends toward the locking hole to be engaged with a peripheral wall of the locking hole.

* * * * *

UNITED STATES PATENT AND TRADEMARK OFFICE
CERTIFICATE OF CORRECTION

PATENT NO. : 9,927,282 B2
APPLICATION NO. : 14/894559
DATED : March 27, 2018
INVENTOR(S) : Atsushi Yasuda et al.

It is certified that error appears in the above-identified patent and that said Letters Patent is hereby corrected as shown below:

On the Title Page

Item (54) and in the Specification, Column 1, Lines 1-2, "MAGNET FLOAT LIQUID LEVEL DETECTOR WITH GUIDED LOCKING CASE" should be --MAGNET FLOAT LIQUID LEVEL DETECTOR WITH GUIDED LOCKING CASING--.

Signed and Sealed this
Twenty-fourth Day of July, 2018

Andrei Iancu
*Director of the United States Patent and Trademark Office*